United States Patent [19]
Tielemans

[11] Patent Number: 5,987,749
[45] Date of Patent: *Nov. 23, 1999

[54] METHOD OF MANUFACTURING A DYNAMIC GROOVE BEARING, DIE SUITABLE FOR USE IN SUCH A METHOD, AND HOUSING AND BEARING PART MANUFACTURED BY SUCH A METHOD

[75] Inventor: Leonardus P. M. Tielemans, Eindhoven, Netherlands

[73] Assignee: U.S. Philips Corporation, New York, N.Y.

[ * ] Notice: Under 35 U.S.C. 154(b), the term of this patent shall be extended for 586 days.

[21] Appl. No.: 08/715,749

[22] Filed: Sep. 19, 1996

Related U.S. Application Data

[63] Continuation of application No. 08/428,851, Apr. 25, 1995, abandoned, which is a continuation of application No. 08/124,738, Sep. 21, 1993, abandoned, which is a continuation-in-part of application No. 08/110,598, Aug. 23, 1993, abandoned.

[30] Foreign Application Priority Data

Sep. 21, 1992 [EP] European Pat. Off. .............. 92202886

[51] Int. Cl.$^6$ .................................................... B21K 1/04
[52] U.S. Cl. ........................................................ 29/898.07
[58] Field of Search ...................... 29/898.04, 898.041, 29/898.07; 72/358; 384/245; 418/178

[56] References Cited

U.S. PATENT DOCUMENTS

| | | | |
|---|---|---|---|
| 2,546,002 | 3/1951 | Jelinek | 384/246 |
| 3,052,955 | 9/1962 | McAndrews et al. | 29/898.07 |
| 3,255,510 | 6/1966 | Josephson et al. | 29/898.042 |
| 3,659,324 | 5/1972 | Murray | 29/898.041 |
| 3,833,275 | 9/1974 | Wendel | 384/240 |
| 3,836,214 | 9/1974 | Gengard et al. | 384/245 |
| 4,370,793 | 2/1983 | Kanamaru et al. | 29/520 |
| 4,377,762 | 3/1983 | Tatsumi et al. | 29/520 |
| 4,384,828 | 5/1983 | Rembold et al. | 418/178 |
| 4,936,126 | 6/1990 | Sato | 72/26 |
| 5,265,457 | 11/1993 | Hayashi et al. | 72/364 |

FOREIGN PATENT DOCUMENTS 282009 12/1991 Japan .................. 29/898.041

*Primary Examiner*—Lowell A. Larson

[57] ABSTRACT

A method of manufacturing a dynamic groove bearing (45, 71, 111) with an external bearing part (17, 61, 91) and an internal bearing part (47, 67, 113) which are rotatable relative to one another and which have cooperating bearing surfaces (39, 53), (63, 69), (103, 121) with groove patterns (41, 65, 105). According to the invention, the bearing surface (39, 63, 103) of one of the bearing parts (17, 61, 91) is formed and simultaneously provided with the groove pattern (41, 65, 105) through plastic deformation of a ductile material (36, 100) by means of a press tool (37, 101) and a die (1, 55, 73) with a die pattern (13, 59, 83) which corresponds to the groove pattern (41, 65, 105). The ductile material (36, 100) is, for example, a tin alloy such as white metal or Babbitt's metal. The die (1, 55, 73) can be repeatedly used so that large numbers of dynamic groove bearings (45, 71, 111) according to the invention can be manufactured in a comparatively simple manner. The method is used in the manufacture of a rotatable scanning unit (123) for reading or writing a magnetic tape (125) in a magnetic tape device (157). The method is also used for the manufacture of a dynamic groove bearing (233, 235) by means of which a rotatable information disc (213) is supported in a compact, cassette-shaped data storage unit (209).

14 Claims, 12 Drawing Sheets

METHOD OF MANUFACTURING A DYNAMIC GROOVE BEARING, DIE SUITABLE FOR USE IN SUCH A METHOD, AND HOUSING AND BEARING PART MANUFACTURED BY SUCH A METHOD

CROSS REFERENCE TO RELATED APPLICATIONS

This is a continuation of application Ser. No. 08/428,851, filed Apr. 25, 1995, which is a continuation of Ser. No. 08/124,738, filed Sep. 21, 1993, which is a continuation-in-part of Ser. No. 8/110,598, filed Aug. 23, 1993, all now abandoned.

BACKGROUND OF THE INVENTION

The invention relates to a method of manufacturing a dynamic groove bearing having an internal bearing part which is arranged coaxially relative to an external bearing part, which bearing parts are rotatable relative to one another and experience at least an axial bearing force during this, by which method the bearing parts are provided with cooperating bearing surfaces, the bearing surface of one of the bearing parts being provided by means of a press tool and one of the bearing surfaces being provided with a pattern of grooves.

The invention also relates to a die suitable for use in a method according to the invention.

The invention also relates to a housing manufactured by a method according to the invention.

The invention also relates to a bearing part manufactured by a method according to the invention.

The invention also relates to a data storage unit comprising an information disc and a scanning unit for cooperating with the information disc, which disc is rotatably supported in a cassette-shaped housing by means of two dynamic groove bearings manufactured by a method according to the invention.

The invention also relates to a method of manufacturing a rotatable scanning unit with a base drum which has an outer wall with a helical magnetic tape guide and a scanning drum which is rotatable relative to the base drum and which has at least one magnetic head, which scanning unit is provided with dynamic groove bearing by a method according to the invention.

Finally, the invention also relates to a magnetic tape device provided with a rotatable scanning unit manufactured by a method according to the invention.

A method of the kind mentioned in the opening paragraph for manufacturing a dynamic groove bearing is known from German Patent Application 22 09 712. In the known method, the press tool comprises a smooth press ball by which a smooth bearing surface with the shape of a sphere segment is pressed into the external bearing part. The internal bearing part is provided with a metal bearing ball, the difference between the radius of the press ball and the radius of the bearing ball being equal to a desired bearing gap height. An accurate bearing gap height is thus provided. The pattern of grooves is provided on the bearing ball in a manner not described in the said Patent Application.

A disadvantage of the known method is that the application of an accurate pattern of grooves on the bearing ball used in the groove bearing by means of, for example, a machining operation or an etching process is time-consuming. As a result, the manufacture of large numbers of groove bearings by the known method is laborious. In addition, the press ball used in the known method must be replaced already after the manufacture of one single groove bearing.

SUMMARY OF THE INVENTION

It is an object of the invention to provide a method of the kind mentioned in the opening paragraph for the manufacture of a dynamic groove bearing by which the disadvantages mentioned above are avoided, so that large numbers of groove bearings can be manufactured in a comparatively short period and in a comparatively simple manner, while a high degree of accuracy is achieved.

The invention is for that purpose characterized in that the bearing surface of one of the bearing parts is shaped and simultaneously provided with the pattern of grooves through plastic deformation of a ductile material by means of the press tool and a die which has a die pattern corresponding to the pattern of grooves. Since the ductile material is deformed by the press tool and the die, the bearing surface of the relevant bearing part and the pattern of grooves are simultaneously formed in a comparatively simple and quick way. The use of the ductile material renders the required pressing force of the press tool comparatively small, so that the die with the die pattern can be repeatedly used in the manufacture of large numbers of groove bearings. Owing to the comparatively small pressing force, furthermore, the rebound of the ductile material caused by the elastic deformation is negligibly small after pressing, so that the bearing surface with the pattern of grooves is manufactured in an accurate manner.

A special embodiment of a method according to the invention, whereby the friction and the wear of the bearing surface manufactured by the method are small during starting or stopping of the dynamic groove bearing, is characterized in that the ductile material is an alloy of tin with lead, an alloy of tin with antimony, or an alloy of tin with lead and antimony.

A further embodiment of a method according to the invention is characterized in that the bearing surface with the pattern of grooves is given a fixed position relative to the corresponding bearing part by the plastic deformation of the ductile material. The fixation of the bearing surface with the pattern of grooves relative to the bearing part in this way means that no separate operations are required for fixing the bearing surface during the formation of the bearing surface.

A yet further embodiment of a method according to the invention is characterized in that the bearing surface with the pattern of grooves is integrated into a housing by the plastic deformation of the ductile material, the housing being fastened on a workbench of a press device which comprises a positioning device by means of which the die is positioned relative to the workbench and the housing during the formation of the bearing surface. Owing to the use of the press device with the workbench and the positioning device, large numbers of bearing parts integrated into housings, for example, suitable for assembly with further components, can be manufactured in a simple and accurate manner.

A particular embodiment of a method according to the invention is characterized in that the bearing surface with the pattern of grooves is formed in the external bearing part, while the die comprises a mandrel which fits in the external bearing part and by means of which the die is positioned relative to the external bearing part during the formation of the bearing surface. The use of the mandrel means that the die pattern of the die can be accurately positioned relative to the external bearing part, so that the bearing surface of the external bearing part according to the method can be provided in an accurate manner relative to the external bearing part.

A further embodiment of a method according to the invention is characterized in that the die pattern is present at an end of the mandrel, the end of the mandrel being applied in a compression chamber of the external bearing part which tapers and merges into an opening for the press tool, while subsequently the ductile material is pressed around the end of the mandrel in the compression chamber by means of the press tool. The use of the tapering compression chamber leads to the formation of a journal socket, while the bearing surface of the external bearing part with the pattern of grooves is at the same time fixed relative to the external bearing part.

A still further embodiment of a method according to the invention is characterized in that a mandrel with a clearing end is used. The use of a mandrel with a clearing end such as, for example, an end in the shape of a sphere segment or a cone, leads to the manufacture of dynamic groove bearings with a comparatively compact construction in which the bearing parts experience a combined radial and axial bearing force.

A special embodiment of a method according to the invention is characterized in that the ductile material is provided between an upper surface of the external bearing part, which upper surface extends perpendicular to a centerline of the external bearing part, and a pressure surface of the die, on which pressure surface the die pattern is present and which, extends perpendicular to a centerline of the mandrel, and is subsequently pressed onto the upper surface by the press tool and the die, whereby the plastic deformation of the ductile material takes place in radial direction and the ductile material is fixed in an annular groove of a collar provided on the upper surface. The use of the said pressure surface leads to a plane dynamic groove bearing, the bearing surface of the external bearing part formed by the method being perpendicular to the centerline of the external bearing part, so that an accurate axial bearing action and a high revolving accuracy of the internal bearing part relative to the external bearing part are achieved.

A particular embodiment of a method according to the invention is characterized in that the bearing surface with the pattern of grooves is formed in a ring-shaped disc, which is made of the ductile material, the ring-shaped disc being provided first around the internal bearing part between a pressure surface of a first die, on which pressure surface a first die pattern is present and which extends perpendicular to a centerline of the internal bearing part, and a pressure surface of a second die, on which pressure surface a second die pattern is present and which extends perpendicular to the centerline of the internal bearing part, while the ring-shaped disc is subsequently pressed by the press tool between the pressure surfaces of the first die and the second die, whereby the plastic deformation of the ductile material takes place in radial direction with respect to the centerline and the ring-shaped disc is fixed in an annular groove provided in the internal bearing part. By the use of said first die and said second die, a ring-shaped bearing surface with a pattern of grooves is formed on both sides of said ring-shaped disc, which disc is simultaneously fixed around the internal bearing part. In this way, a plane axial dynamic groove bearing is formed providing a bearing force in two opposite axial directions.

A further embodiment of a method according to the invention is characterized in that the die is positioned in axial direction relative to the corresponding bearing part with the aid of a sensor during the formation of tie bearing surface, which sensor measures an axial position of the die relative to the relevant bearing part. The use of the said sensor achieves that the bearing surface is provided in an accurate, predetermined axial position relative to the bearing part by the die.

A data storage unit comprising an information disc and a scanning unit for cooperating with the information disc, which disc is rotatably supported in a cassette-shaped housing by means of two dynamic groove bearings manufactured by a method according to the invention, is characterized in that the housing comprises two main walls extending parallel to and on either side of the information disc, into which main walls the external bearing parts of the respective dynamic groove bearings are integrated. The integration of the external bearing parts of the groove bearings into the two main walls in the manner indicated above provides an effective, compact and convenient housing for the data storage unit.

A method of manufacturing a rotatable scanning unit with a base drum which has an outer wall with a helical magnetic tape guide and a scanning drum which is rotatable relative to the base drum and which has at least one magnetic head, which scanning unit is provided with a dynamic groove bearing by a method according to the invention, is characterized in that the base drum is provided with the external bearing part, the magnetic tape guide being used as a reference for the axial positioning of the die pattern of the die relative to the external bearing part. Since the magnetic tape guide is used as a reference in the axial positioning of the die in the external bearing part, the bearing surface of the base drum is provided in an accurate axial position relative to the magnetic tape guide, so that the scanning drum is accurately positioned in axial direction relative to the magnetic tape guide by means of the dynamic groove bearing.

A magnetic tape device in which the properties of the rotatable scanning unit used therein and manufactured by a method according to the invention become particularly apparent is characterized in that the magnetic tape device comprises a space for the accommodation of a magnetic tape cassette and a mechanism for transporting and guiding a magnetic tape along the scanning unit.

BRIEF DESCRIPTION OF THE DRAWING

The invention is explained in more detail below with reference to the drawing in which FIG. 1a diagrammatically shows a first embodiment of a device for carrying out a method according to the invention for the manufacture of a dynamic groove bearing, FIG. 1b diagrammatically shows a second embodiment of a device for carrying out a method according to the invention for the manufacture of a dynamic groove bearing, FIG. 2 diagrammatically shows a third embodiment of a device for carrying out a method according to the invention for the manufacture of a dynamic groove bearing, FIG. 8b shows a dynamic groove bearing manufactured by means of the device of FIG. 8a.

DETAILED DESCRIPTION OF THE PREFERRED EMBODIMENTS

Figure 1A:
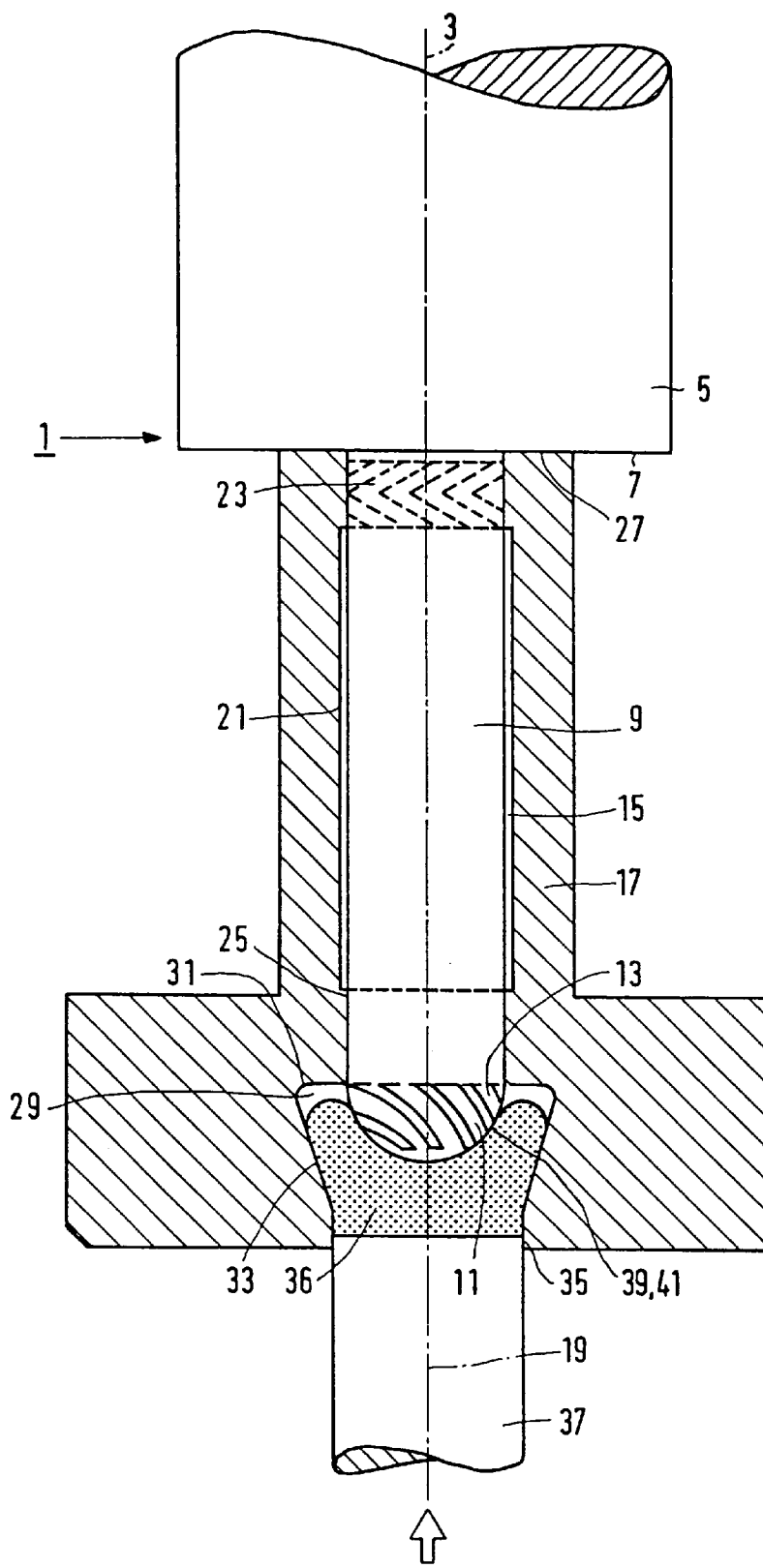

The first embodiment of a device for carrying out a method according to the invention for the manufacture of a dynamic groove bearing as shown in FIG. 1a comprises an elongate, hard-metal die 1 with a centerline 3 and a base 5 which is provided with a base surface 7 extending perpendicular to the centerline 3. The die 1 further comprises a circular-cylindrical mandrel 9 which is perpendicular to the base surface 7. The mandrel 9 is provided with an end 11 in the form of a sphere segment on which a die pattern 13 is provided which corresponds to a pattern of grooves to be provided by means of the die 1.

The mandrel 9 of the die 1 is provided in a substantially circular-cylindrical chamber 15 of an external bearing part 17 having a centerline 19. The chamber 15 is provided with an inner wall 21 with a first, circular-cylindrical wall portion 23 and a second, circular-cylindrical wall portion 25. The circular-cylindrical mandrel 9 fits without clearance between the wall portions 23 and 25, which have equal diameters, the centerline 3 of the die 1 and the centerline 19 of the chamber 15 coinciding. The base surface 7 of the die 1 rests on an upper surface 27 of the external bearing part 17 provided perpendicularly to the centerline 19 of the chamber 15.

As is further depicted in FIG. 1a, the end 11 of the mandrel 9 with the die pattern 13 is present in a tapering compression chamber 29 of the external bearing part 17. The compression chamber 29, whose centerline coincides with the centerline 19, has an upper wall 31 extending transverse to the centerline 19 and a tapering side wall 33 which narrows conically from the upper wall 31 and ends in a round opening 35. A so-called ductile material 36 is provided in the compression chamber 29, for example, an alloy of tin with lead, an alloy of tin with antimony (white metal), or an alloy of tin with lead and antimony (Babbitt's metal). In addition to the said elements, these alloys may also comprise copper. Such a material is plastically deformable under comparatively small compression forces, while the elastic deformation of the material is comparatively small. The ductile material 36 is pressed around the end 11 of the mandrel 9 by a press tool 37 which fits without clearance in the opening 35 of the compression chamber 29. As a result, the external bearing part 17 is given a bearing surface 39 in the form of a sphere segment and having a pattern of grooves 41 corresponding to the die pattern 13 through plastic deformation of the ductile material 36. Owing to the good plastic deformability of the ductile material 36, the pattern of grooves 41, which has a groove depth of approximately ten micrometers, is formed in an accurate manner. Since the required compression force is comparatively small and the bearing surface 39 is comparatively large, the rebound caused after pressing by the elastic deformation of the ductile material 36 is extremely small. As is shown in FIGS. 1a and 3a, the ductile material 36 is fixed relative to the external bearing part 17 between the upper wall 31 and the tapering side wall 33 of the compression chamber 29 by the plastic deformation, so that the bearing surface 39 with the pattern of grooves 41 is also brought into a fixed, accurate position in relation to the external bearing part 17.

Since the ductile material 36 is comparatively soft, no appreciable damage is caused to the die pattern 13 during pressing of the ductile material 36 around the end 11 of the mandrel 9. The die 1 accordingly can be repeatedly used in the production of large numbers of bearing parts 17. Compared with alternative techniques, whereby the pattern of grooves is provided, for example, in a machining operation or a comparatively laborious etching process, the repeated use of the die 1 leads to a considerable simplification and time saving in the manufacture of large numbers of bearing parts 17.

Figure 3A:
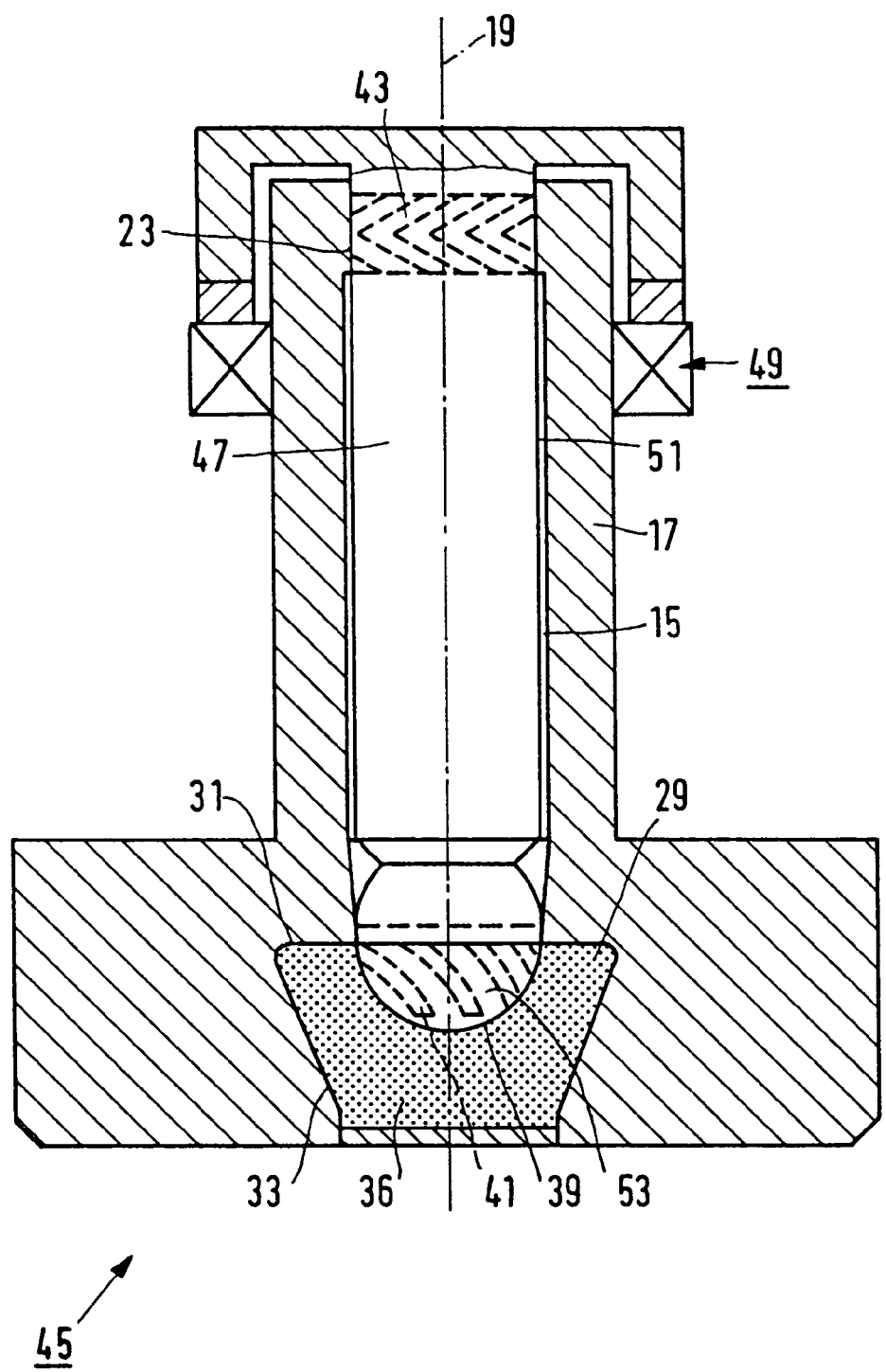
FIG. 3a shows a dynamic groove bearing manufactured by means of the device of FIG. 1a, FIG. 3b shows a dynamic groove bearing manufactured by means of the device of FIG. 1b.

FIG. 3a shows an external bearing part 17 manufactured by the device shown in FIG. 1a, in which the first circular-cylindrical wall portion 23 of the chamber 15 is provided with a further pattern of grooves 43. The external bearing part 17 forms a dynamic groove bearing 45 in conjunction with an internal bearing part 47 which is rotatable in the chamber 15 for this purpose by means of a diagrammatically indicated drive unit 49. The internal bearing part 47 to this end further comprises a smooth, circular-cylindrical outer wall 51 for cooperating with the further pattern of grooves 43 and a smooth ball 53 for cooperating with the pattern of grooves 41 of the bearing surface 39 formed from the ductile material 36 which thus constitutes a journal socket for the internal bearing part 47. Upon rotation of the internal bearing part 47, the bearing parts 17 and 47 of the operating dynamic groove bearing 45 can absorb an axial and a radial bearing force through cooperation of the pattern of grooves 41 and the ball 53, and a radial bearing force only through cooperation of the further pattern of grooves 43 and the outer wall 51. The bearing parts 17 and 47 under normal circumstances come into mutual contact exclusively during starting and stopping of the said rotation. Any wear of the bearing surface 39 occurring during this remains limited through the use of the said tin alloys.

Figure 1B:
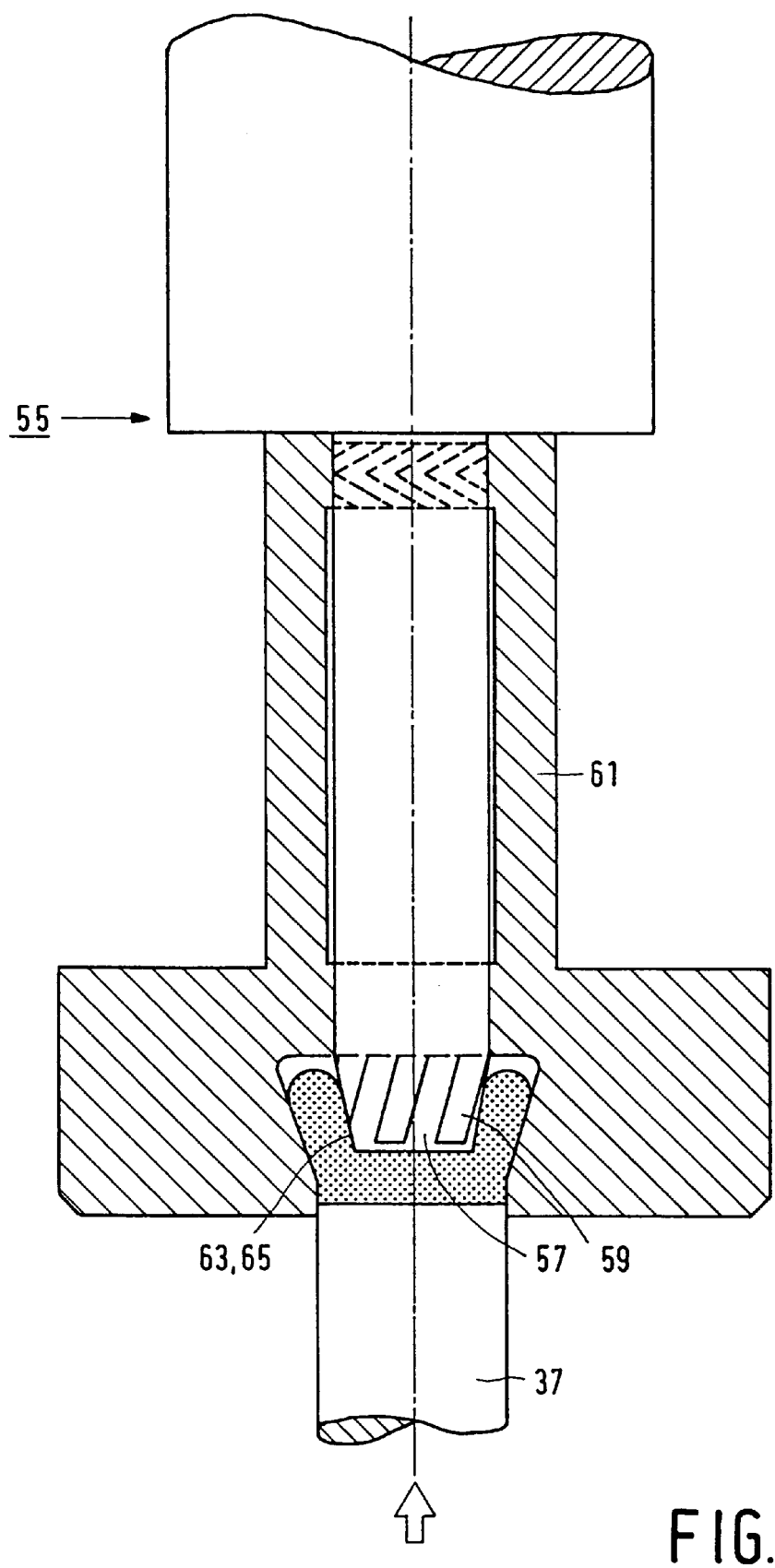
Figure 3B:
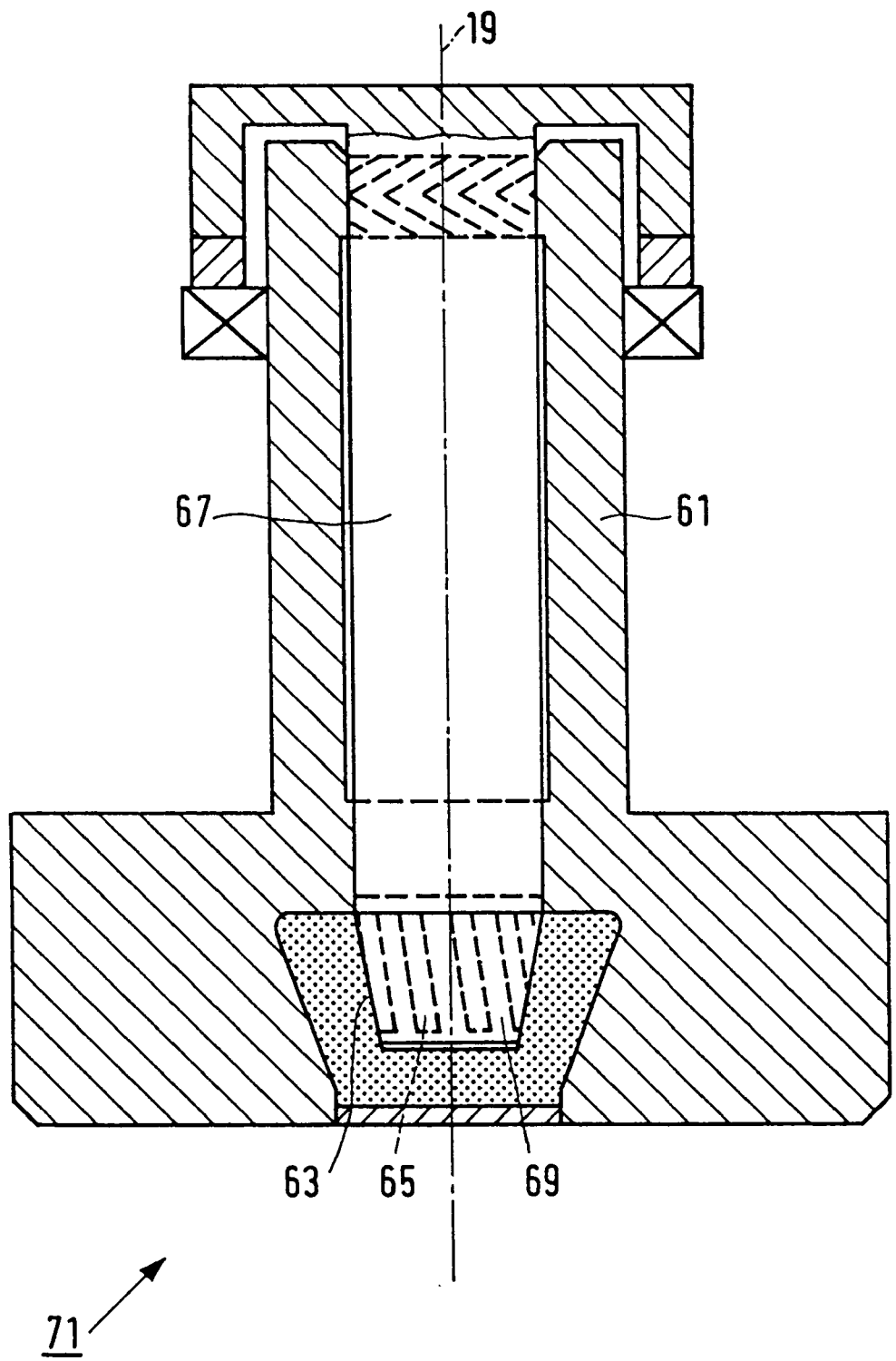

In the second embodiment of a device for carrying out a method according to the invention for the manufacture of a dynamic groove bearing, shown in FIG. 1b, a die 55 similar to the die 1 shown in FIG. 1a is used, but here provided with a conical end 57 with a die pattern 59. A conical bearing surface 63 is provided in an external bearing part 61 by the use of the die 55, with a pattern of grooves 65 corresponding to the die pattern 59. As is shown in FIG. 3b, the bearing surface 63 forms a conical journal socket for an internal bearing part 67 which is provided with a smooth cone 69 for cooperating with the bearing surface 63 and which forms a dynamic groove bearing 71 in conjunction with the external bearing pair 61. The bearing parts 61 and 67 can absorb a bearing force having a radial and an axial component upon rotation of the internal bearing part 67 in the external bearing part 61 through cooperation of the groove pattern 65 and the cone 69.

Figure 2:
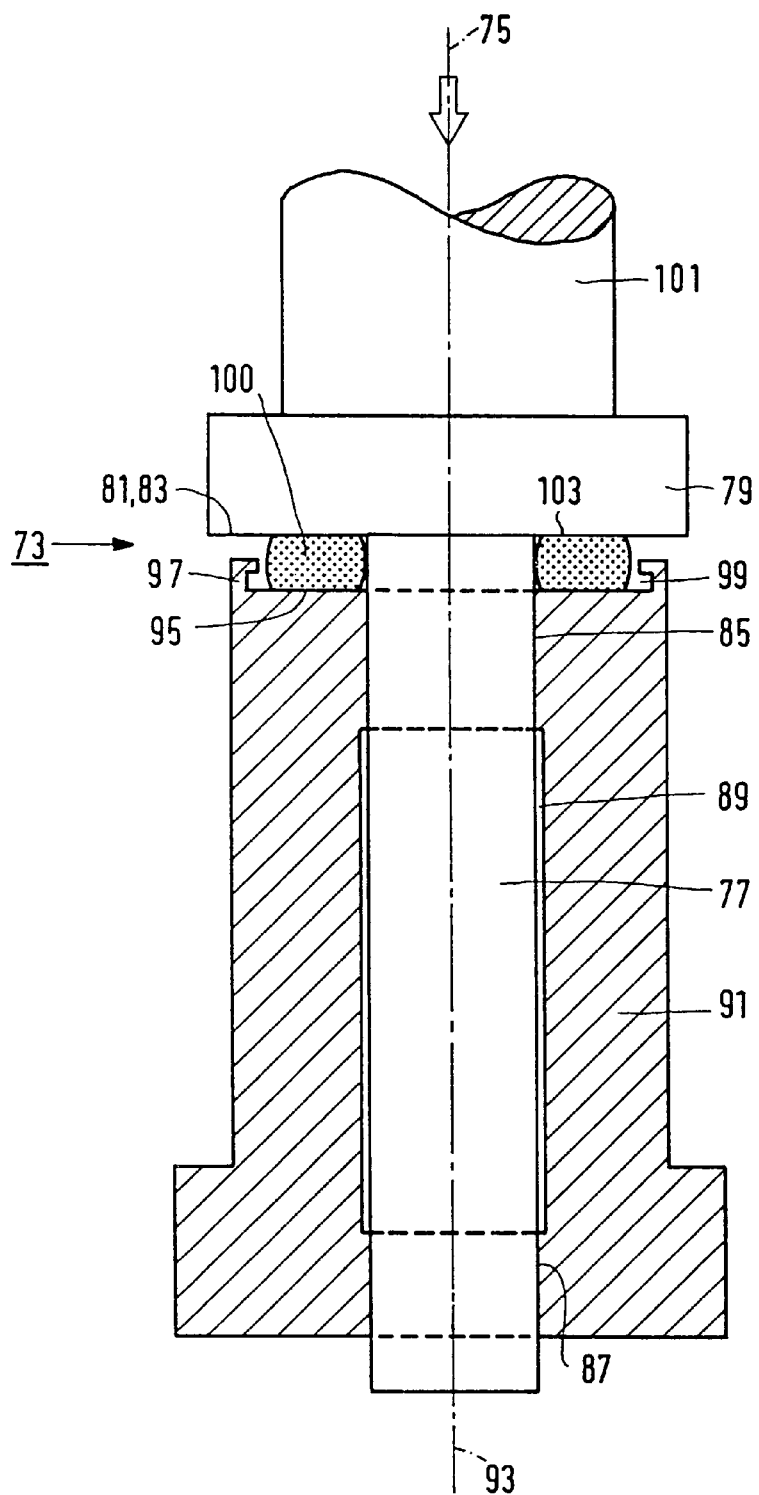

In the third embodiment of a device for carrying, out a method according to the invention for the manufacture of a dynamic groove bearing, shown in FIG. 2, a die 73 is used with a centerline 75, a circular-cylindrical mandrel 77 and a base 79 with a pressure surface 81 extending perpendicular to the centerline 75, on which pressure surface a die pattern 83 not visible in the figure is provided. The mandrel 77 fits without clearance between two circular-cylindrical wall portions 85 and 87 of a substantially circular-cylindrical chamber 89 of an external bearing part 91 with centerline 93 to be manufactured by means of the die 73, so that the pressure surface 81 of the die 73 is perpendicular to the centerline 93. The external bearing part 91 further comprises an annular upper surface 95 extending perpendicular to the centerline 93 and surrounded by an annular collar 97 with an inside which is provided with an annular groove 99.

Figure 4A:
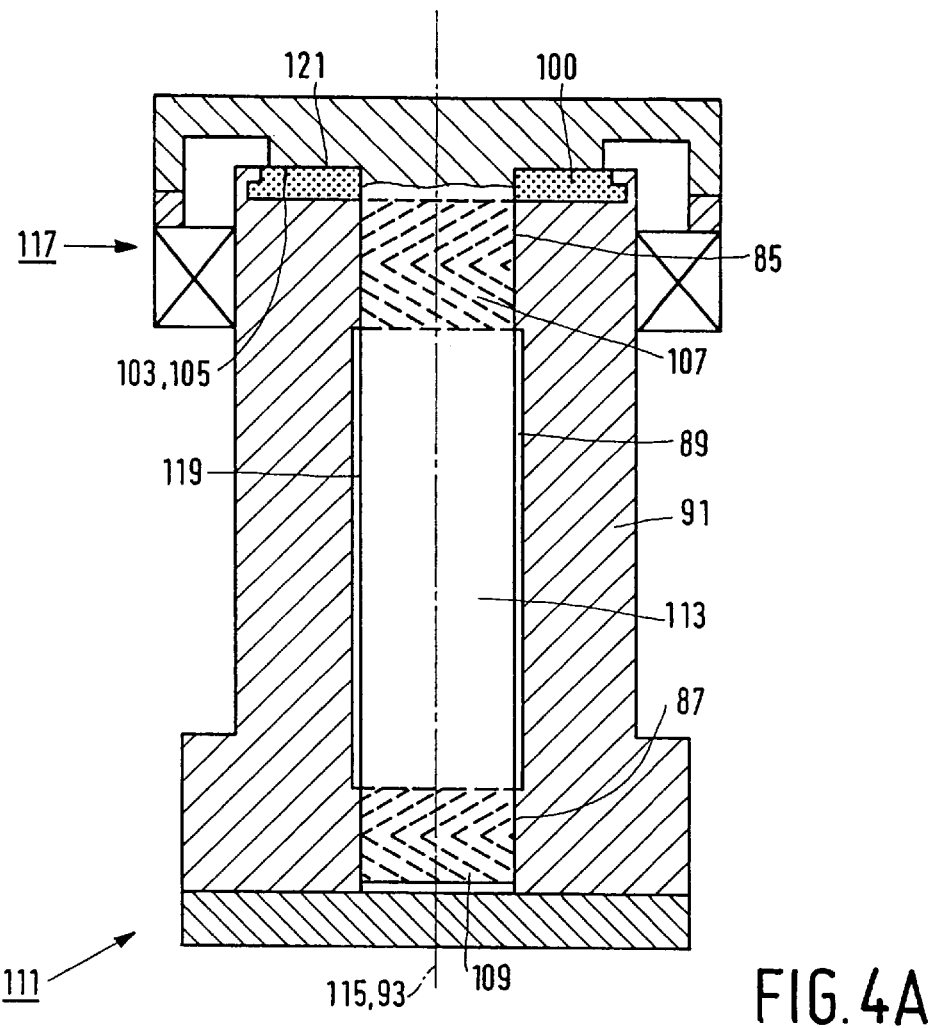
FIG. 4a shows a dynamic groove bearing manufactured by means of the device of FIG. 2.
Figure 4B:
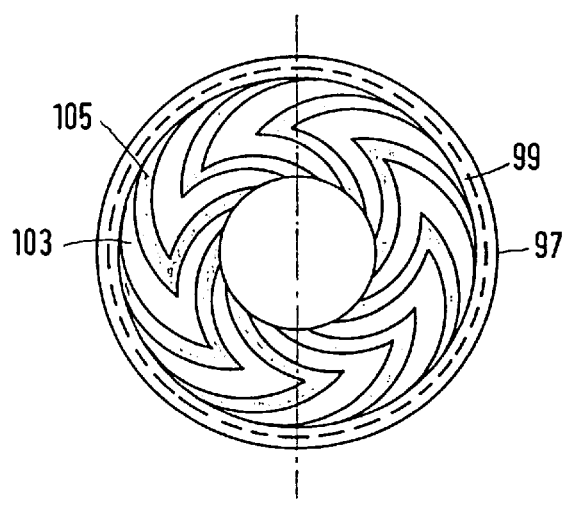
FIG. 4b shows a pattern of grooves of a dynamic groove bearing according to FIG. 4a, FIG. 5a shows in cross-section a rotatable scanning unit for a magnetic tape provided with a dynamic groove bearing according to FIG. 4a, FIG. 5b diagrammatically shows a device for carrying out a method according to the invention for the manufacture of the scanning unit of FIG. 5a, FIG. 5c diagrammatically shows a magnetic tape device which is provided with the scanning device of FIG. 5a, FIG. 6a diagrammatically shows a press device for carrying out a method according to the invention for the manufacture of a bearing part integrated in a housing.

In the device shown in FIG. 2, a ductile material 100 is provided between the upper surface 95 of the external bearing part 91 and the pressure surface 81 of the die 73. Then a force is exerted on the base 79 of the die 73 by a press tool 101 so that a plane, annular bearing surface 103 is formed on the upper surface 95 through plastic deformation of the ductile material 100, with a pattern of grooves 105 not shown in FIG. 4b and corresponding to the die pattern 83. The plastic deformation of the ductile material 100 takes place mainly in radial direction, so that the ductile material 100 penetrates to inside the annular groove 99, and the bearing surface 103 is fixed relative to the external bearing part 91 in the annular groove 99, as is shown in FIG. 4a. Since the mandrel 77 of the die 73 fits the chamber 89 of the external bearing part 91 without clearance, the bearing surface 103 provided by the die 73 is perpendicular to the centerline 93 of the external bearing part 91, whereby the bearing surface 103 is accurately positioned relative to the external bearing part 91.

The external bearing part 91 manufactured by the die 73 is shown in FIG. 4a. The two circular-cylindrical wall portions 85 and 87 of the chamber 89 are provided with further patterns of grooves 107 and 109. The external bearing part 91 forms a dynamic groove bearing 111 in conjunction with an internal bearing part 113 with a centerline 115, which is for this purpose rotatable in the chamber 89 of the external bearing part 91 by means of a diagrammatically indicated drive unit 117 and which is provided with a smooth, circular-cylindrical outer wall 119 and a smooth bearing surface 121 extending perpendicular to the centerline 115 for cooperating with the further groove patterns 107, 109 and the groove pattern 105 of the bearing surface 103, respectively. Upon rotation of the internal bearing part 113, the bearing parts 91 and 113 can absorb an axial bearing force through the cooperation of the groove pattern 105 and the bearing surface 121, and a radial bearing force through the cooperation of the further groove patterns 107, 109 and the outer wall 119.

It is noted that the area size of the bearing surface 103 of the dynamic groove bearing 111 may be chosen independently of the diameter of the wall portions 85 and 87 in the design phase, so that the groove bearing 111 may be specially designed for absorbing comparatively large axial bearing forces. The dynamic groove bearings 45 and 71 shown in FIG. 3a and 3b have a comparatively compact construction, so that the groove bearings 45 and 71 are particularly suitable for use in devices of comparatively small dimensions in which high requirements are imposed on the accuracy and low wear of the bearings to be used therein. It is further noted that a liquid lubricant may be used in the grooves of the groove bearings 45, 71 and 111. If a liquid lubricant cannot be used, for example, because the pollution caused thereby is inadmissible, the groove bearings 45, 71 and 111 may alternatively be used without liquid lubricant, the bearing forces being absorbed by the air or gas pressure built up in the grooves.

Figure 5A:
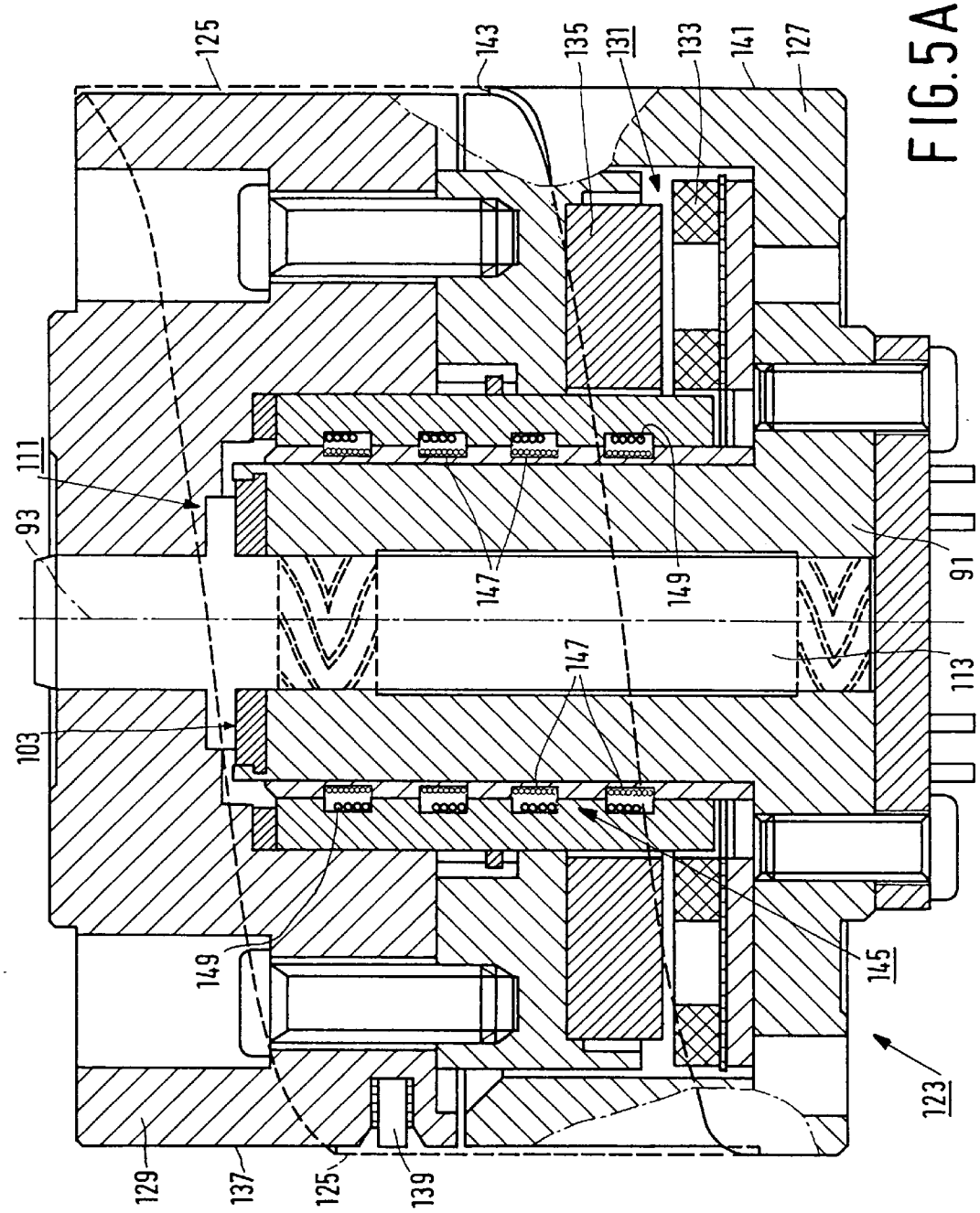

The dynamic groove bearing 111 shown in FIG. 5a is used in a rotatable scanning unit 123 shown in cross-section in FIG. 5a, by means of which data are written onto or read from a magnetic tape 125. The magnetic tape 125 is indicated with a broken line in FIG. 5a. The scanning unit 123 comprises a base drum 127 and a scanning drum 129 of substantially equal diameters. The scanning drum 129 has its bearings relative to the base drum 127 in the dynamic groove bearing 111 and is rotatable relative to the base drum 127 by means of an electric drive motor 131. The external bearing part 91 of the dynamic groove bearing 111 is fastened to the base drum 127, while the internal bearing part 113 is fastened to the scanning drum 129. The electric drive motor 131 comprises an annular electric stator coil 133 fastened to the base drum 127 and an annular permanent-magnetic rotor 135 fastened to the scanning drum 129. Two magnetic heads 139 for reading and writing of the magnetic tape 125 are present in an outer wall 137 of the scanning drum 129. Only one magnetic head 139 is visible in FIG. 5a. Furthermore, a helical magnetic tape guide 143 is provided on an outer wall 141 of the base drum 127. When the magnetic tape 125 is guided over the helical magnetic tape guide 143 of the base drum 127 by a mechanism not shown in FIG. 5a and the scanning drum 129 is rotated relative to the base drum 127 at a comparatively high speed, data in the form of sloping tracks on the magnetic tape 125 may be written onto or read from the magnetic tape 125 by the magnetic heads 139. The scanning unit 123 further comprises an inductive data transmitter 145 with a number of primary electric coils 147 which are fastened to the base drum 127 and a number of secondary electric coils 149 which are fastened to the scanning drum 129, by means of which electrical signals coming from the magnetic heads 139 can be transmitted from the rotatable scanning drum 129 to the base drum 127 and vice versa.

Since the magnetic tape 125 should be accurately guided along the scanning drum 129, high requirements are imposed on the accuracy of the dynamic groove bearing 111, in particular on the axial position and revolving accuracy of the internal bearing part 113 in relation to the external bearing part 91, and on the perpendicularity of the bearing surface 103 relative to the centerline 93. The dynamic groove bearing 111 accordingly forms a component which is very important for a satisfactory functioning of the scanning unit 123. When the groove bearing 111 is manufactured by the method described above, the requirements regarding the revolving accuracy and perpendicularity can be satisfied in a comparatively simple manner, so that a considerable simplification is offered in mass manufacture of scanning units 123 for use in magnetic tape devices such as, for example, video cassette recorders or video cameras.

Figure 5B:
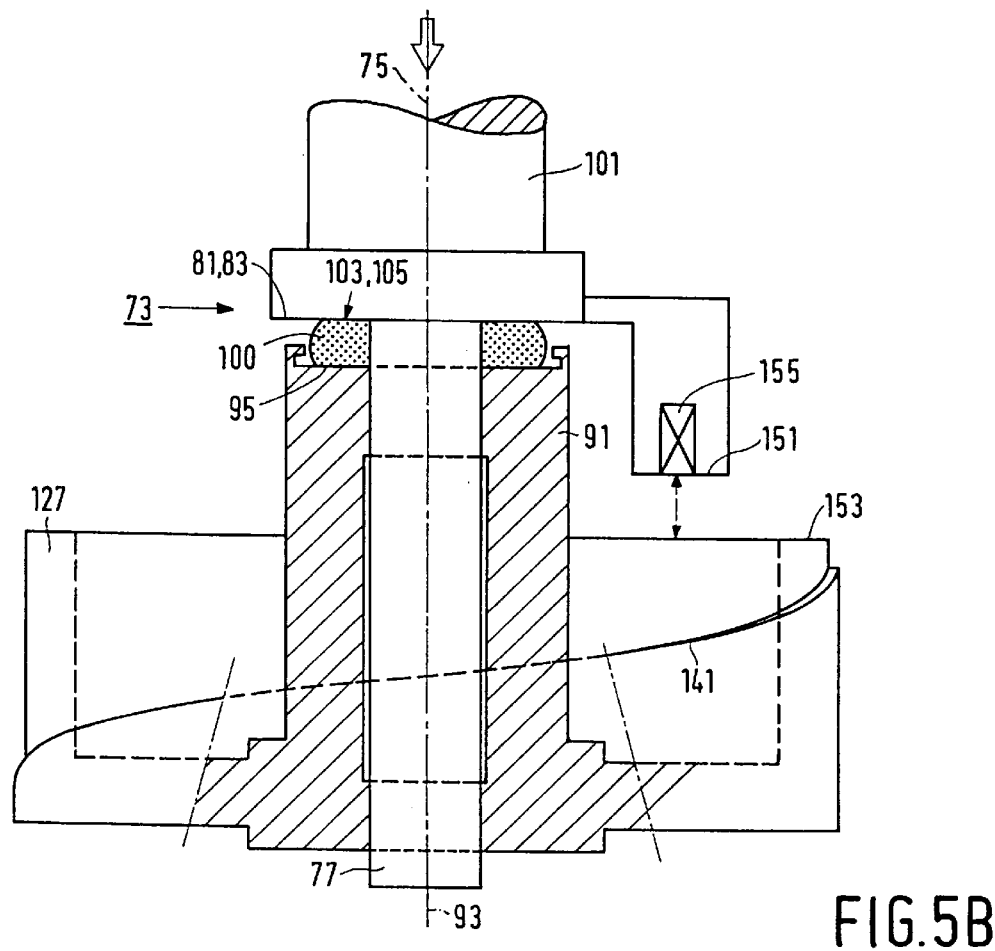

As is shown in FIG. 5b, an accurate axial position of the internal bearing part 113 is achieved in that the die 73 discussed above with reference to FIG. 2 is used in the manufacture of the dynamic groove bearing 111 applied for the scanning unit 123. The die 73 is for this purpose further provided with a reference surface 151 which is perpendicular to the centerline 75 of the die 73 and which is in an accurately defined position relative to the pressure surface 81 on which the die pattern 83 is provided. The die 73 is provided in the external bearing part 91 of the base drum 127, on which a further reference surface 153 is provided which is perpendicular to the centerline 93 of the external bearing part 91 and which is in an accurately defined position relative to the magnetic tape guide 141. The spacing between the two reference surfaces 151 and 153 is measurable by means of an optical sensor 155 of a usual kind which is known per se and which is indicated only diagrammatically in FIG. 5b. During pressing of the ductile material 100 on the upper surface 95 of the external bearing part 91, the spacing between the reference surfaces 151 and 153 is measured by the sensor 155, the movement of the press tool 101 being stopped when a previously determined reference spacing between the reference surfaces 151 and 153 has been achieved. In this manner the bearing surface 103 with the pattern of grooves 105 of the external bearing part 91 is provided in an accurate axial position relative to the magnetic tape guide 141, so that the scanning drum 129 with the magnetic heads 137 depicted in FIG. 5a has an accurate axial position relative to the magnetic tape guide 141.

Figure 5C:
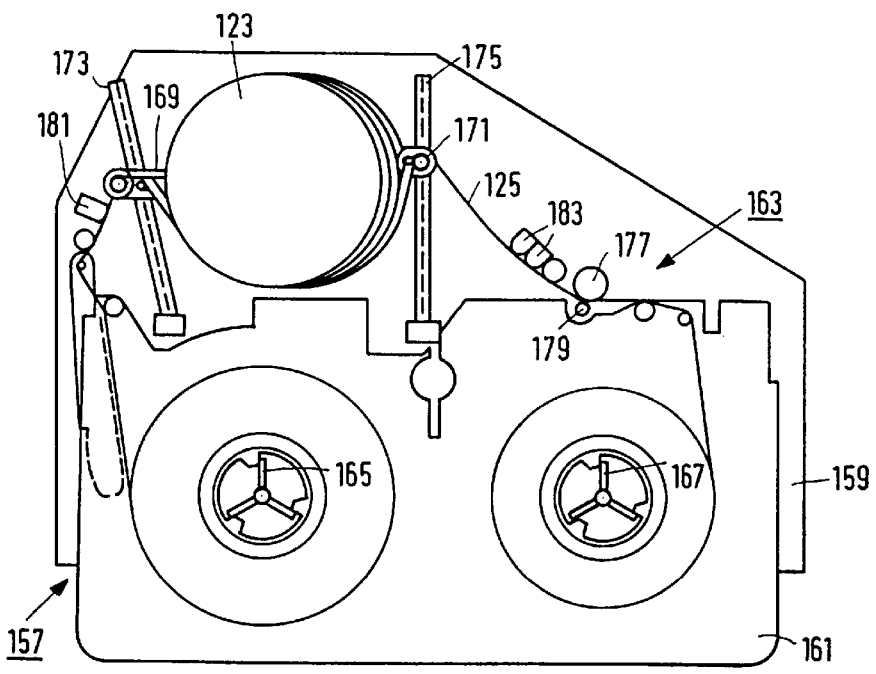

The scanning unit 123 manufactured in accordance with FIG. 5b forms the heart of e.g. a magnetic tape device 157 diagrammatically pictured in FIG. 5c and provided with a space 159 for accommodating a magnetic tape cassette 161 and with a mechanism 163 for transporting and guiding of the magnetic tape 125 present in the magnetic tape cassette 161 along the scanning unit 123. The mechanism 163 comprises two reel drive shafts 165, 167 for cooperating with the magnetic tape cassette 161, and two tape lacing means 169, 171 which are displaceable along guides 173 and 175. The magnetic tape 125 is pulled from the magnetic tape cassette 161 by the tape lacing means 169, 171 upon starting of the magnetic tape device 157 and guided around the scanning unit 123. The mechanism 163 further comprises a pressure roller 177 which presses the magnetic tape against a tone shaft 179. The tone shaft 179, which is driven by a motor not shown in FIG. 5c, pulls the magnetic tape 125 along the scanning unit 123 with an accurately defined speed. Furthermore, the magnetic tape device 157 comprises two stationary magnetic heads 181 and 183 for erasing information and writing auxiliary information, respectively, on the magnetic tape 125.

Figure 6A:
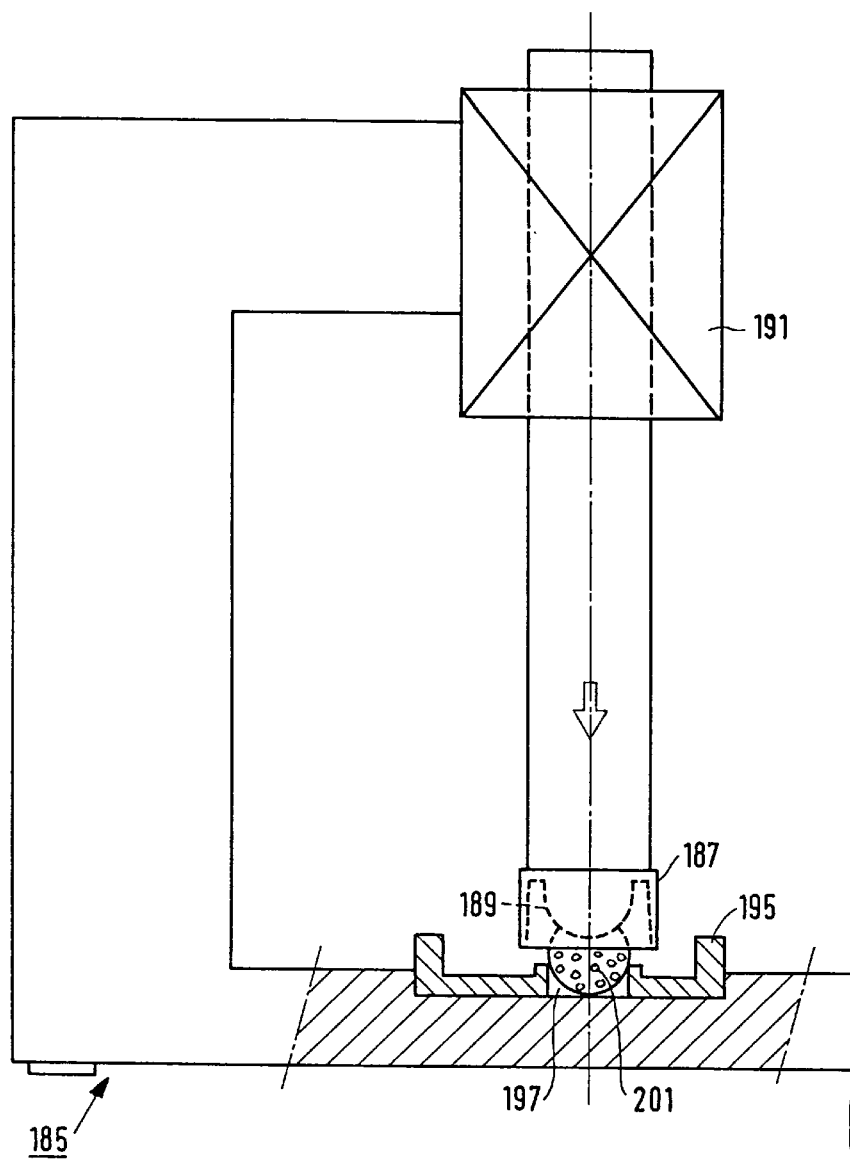
FIG. 6b shows a housing with an integrated bearing part manufactured by means of the press device of FIG. 6a, FIG. 6c diagrammatically shows a data storage unit provided with a dynamic groove bearing manufactured by means of the press device of FIG. 6a, FIG. 7 diagrammatically shows a device for carrying out a method according to the invention for the manufacture of an internal bearing part, FIG. 8a diagrammatically shows a fourth embodiment of a device for carrying out a method according to the invention for the manufacture of a dynamic groove bearing.
Figure 6B:
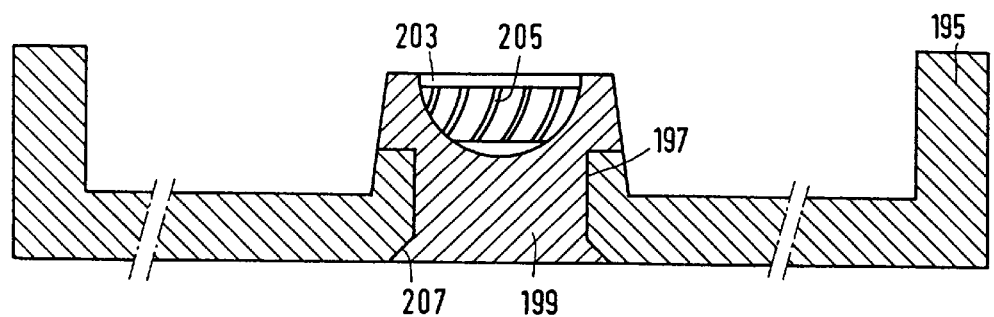

In the devices for carrying out a method according to the invention shown in FIGS. 1a, 1b, 2 and 5b, a die 1, 55, 73 is used each time provided with a mandrel 9, 77 with which the die 1, 55, 73 is brought into an accurate position relative to the corresponding bearing part 17, 61, 91. FIG. 6a diagrammatically shows a press device 185 for carrying out a method according to the invention in which a die 187 provided with a die pattern 189 is positioned relative to a workbench 193 by means of a positioning device 191 which is depicted only diagrammatically. A workpiece is fastened on the workbench 193, for example, a metal or synthetic-resin housing 195 which, for example, is a component of a device or unit to be assembled afterwards. The housing 195 is provided with a recess 197 in which an external bearing part 199, shown in FIG. 6b, of a dynamic groove bearing to be subsequently assembled is formed by means of the press device 185. For this purpose, a ductile material 201 is provided between the recess 197 and the die 187, after which the die 187 is brought into an accurate position relative to the housing 195 by means of the positioning device 191. The bearing part 199, which has a bearing surface 203 in the form of a sphere segment and a pattern of grooves 205 corresponding to the die pattern 189, is formed thereby through plastic deformation of the ductile material 201. As is shown in FIG. 6b, the recess 197 is provided with a bevelled edge 207 into which the ductile material 201 penetrates during pressing, so that the bearing part 199 is fixed relative to the housing 195. Large numbers of housings 195 can be provided with integrated bearing parts 199 in a fast and simple manner by means of the press device 185.

Figure 6C:
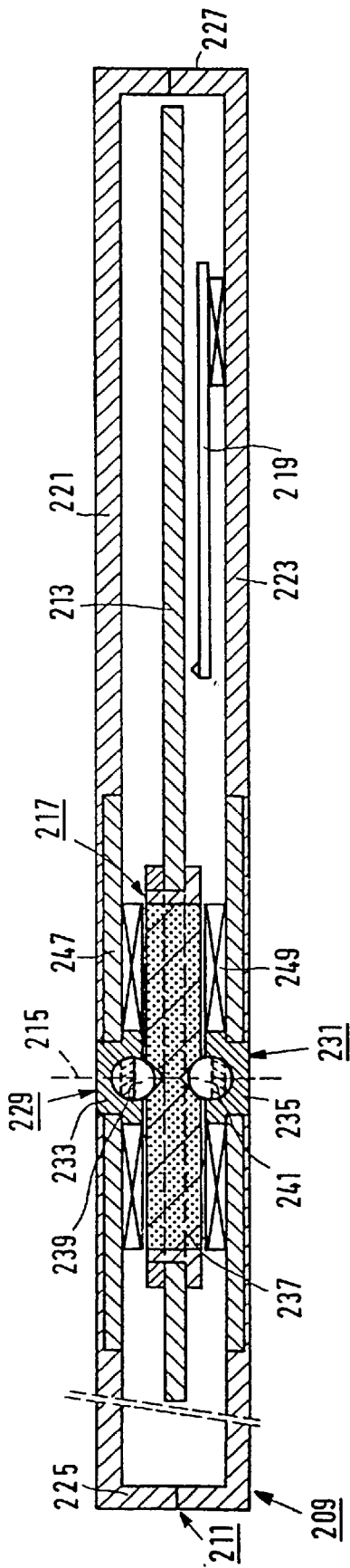

FIG. 6c shows a data storage unit 209 with a cassette-shaped housing 211 in which an information disc 213 is rotatable about an axis of rotation 215 by an electric drive unit 217. The information disc 213 is, for example, a so-called hard disk with a magnetic layer in which information can be stored or from which information can be read by a diagrammatically shown scanning unit 219. The cassette-shaped housing 211 comprises two main walls 221 and 223 extending parallel to and on either side of the information disc 213, and four side walls interconnecting the two main walls 221, 223. Only two side walls 225 and 227 are visible in FIG. 6c. The main walls 221 and 223 each belong to a housing 229, 231, which housings are provided with external bearing parts 233 and 235 of a ductile material in a manner shown in FIG. 6b. The information disc 213 is fastened to a magnetic rotor 237 of the drive unit 217. The rotor is provided with two smooth balls 239 and 241 which form two dynamic groove bearings together with the external bearing parts 233 and 235 which the information disc 213 is supported relative to the housing 211. The drive unit 217 is further provided with two electric coil systems 247 and 249 fastened to the main walls 221 and 223. The use of the dynamic groove bearings, whose external bearing parts 233 and 235 are integrated with the main walls 221 and 223 by a method according to the invention, provide the data storage unit 209 with a compact, light and convenient housing of minimum dimensions.

Figure 7:
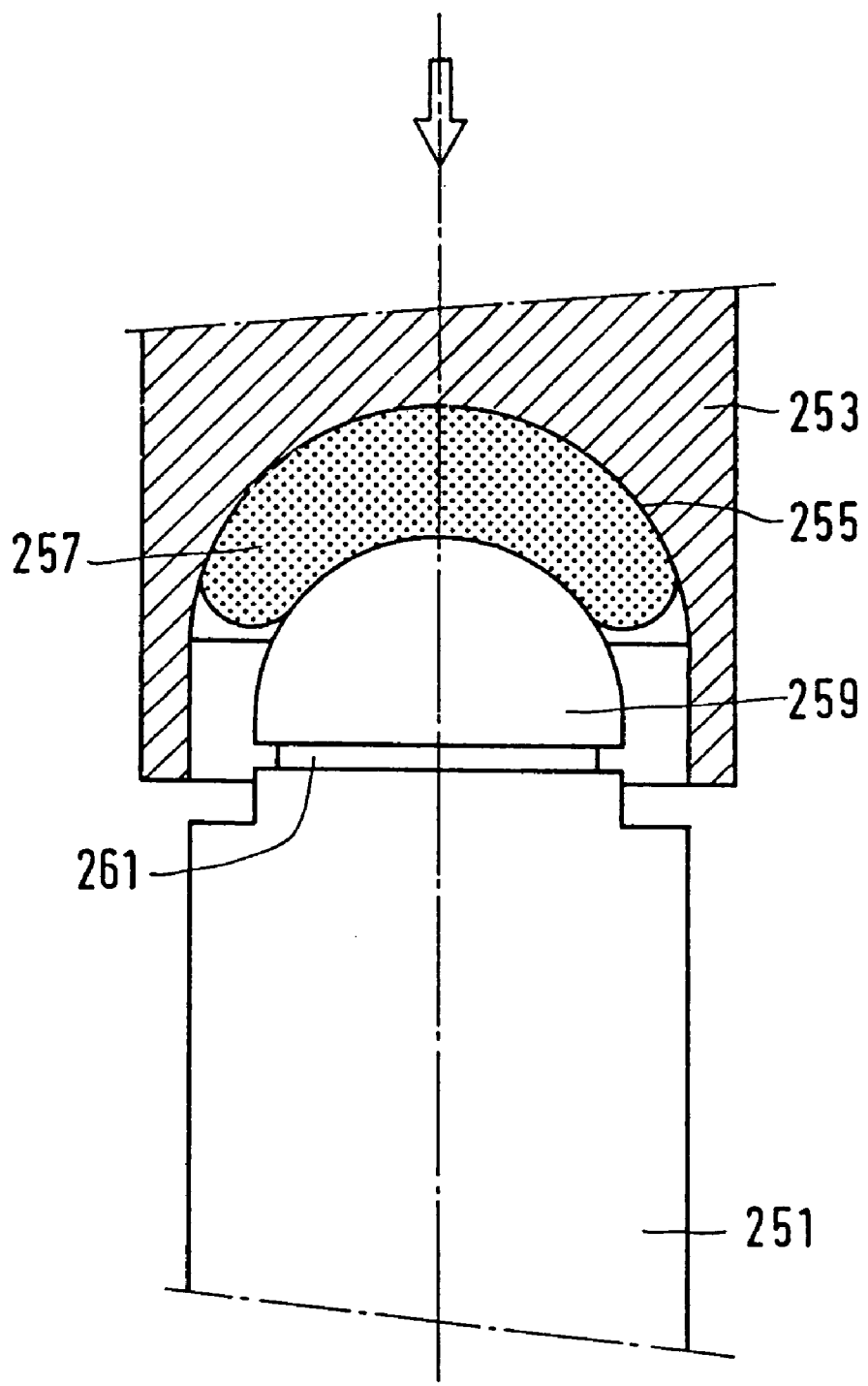

In the examples described above, a bearing surface with a pattern of grooves is formed each time in an external bearing part of a dynamic groove bearing. It is noted that the method according to the invention is alternatively capable of providing internal bearing parts with bearing surfaces comprising groove patterns formed from a ductile material. FIG. 7 diagrammatically shows a device by means of which an internal bearing part such as, for example, a shaft 251 is provided with a bearing surface. A die 253 is used here with a hollow die surface 255 on which a die pattern is provided corresponding to the pattern of grooves to be provided. The ductile material 257 is provided around a core 259 of the shaft 251, which is provided with an annular groove 261 for fixing the ductile material 257 relative to the shaft 251, by means of the die 253.

Figure 8A:
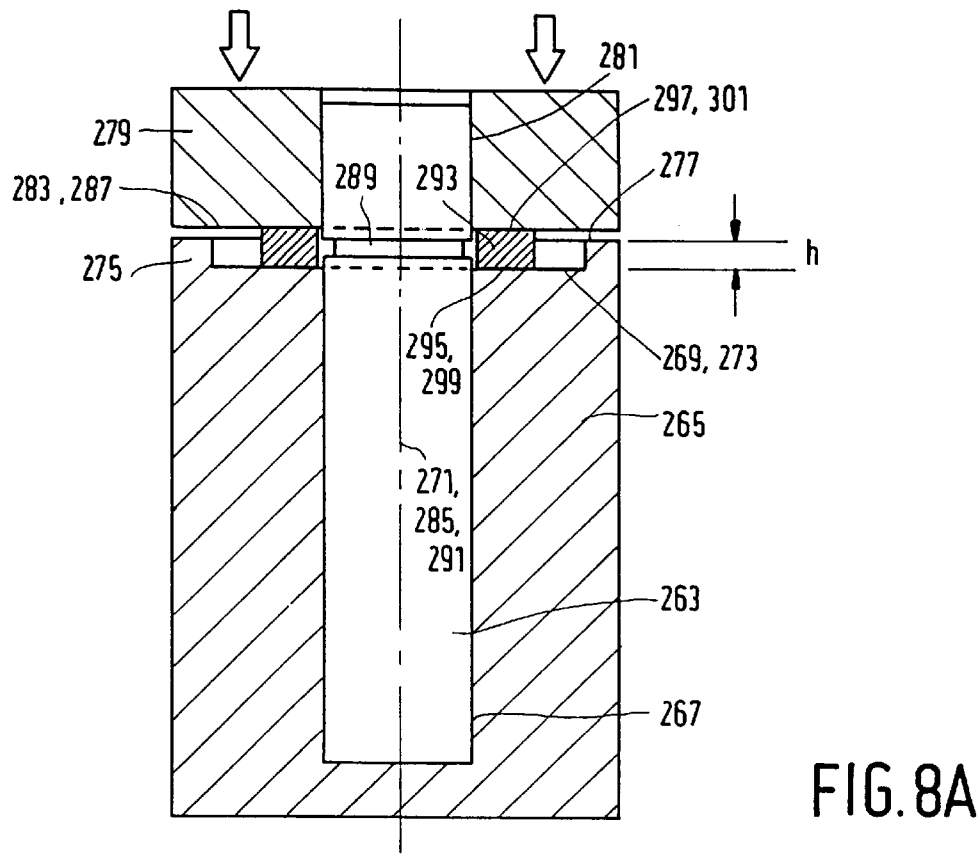

FIG. 8a diagrammatically shows a fourth embodiment of a device for carrying out a method according to the invention. In this embodiment, just as in the embodiment of FIG. 7, an internal bearing part comprising an elongate shaft 263 is provided with a bearing surface having groove patterns formed on a ductile material. The device of FIG. 8a comprises a first die 265 having a circular cylindrical cavity 267, in which the shaft 263 fits substantially without clearance. The first die 265 further comprises a ring-shaped pressure surface 269 extending perpendicular to a centerline 271 of the first die 265, on which pressure surface 269 a die pattern 273 not visible in the figure is present. Furthermore, the first die 265 comprises an annular collar 275 which concentrically surrounds the pressure surface 269. The collar 275 has a height h and comprises an upper surface 277 extending perpendicular to the centerline 271. The device of FIG. 8a further comprises a second die 279 with a circular cylindrical cavity 281, in which the shaft 263 also fits without clearance. The second die 279 comprises a ring-shaped pressure surface 283 extending perpendicular to a centerline 285 of the second die 279, on which pressure surface 283 a die pattern 297 not visible in the figure is present. According to the method of FIG. 8a, the shaft 263 is provided with an annular groove 289 extending in a plane perpendicular to a centerline 291 of the shaft 263. A ring-shaped disc 293 made of a ductile material, such as aluminium or bronze, is provided around the shaft 263 near the annular groove 289. Subsequently, the shaft 263 in placed in the cavity 267 of the first die 265 and the second die 279 is placed around the shaft 263, so that the ring-shaped disc 293 is placed between the pressure surfaces 269, 283 of the first and second dies 265, 279 and so that the centerlines 271, 285, 291 of the first and second dies 265, 273 and of the shaft 263 coincide. Subsequently, a pressure force is exerted on the second die 279 by a press tool not shown in the figure, under the influence of which the disc 293 is plastically deformed in a radial direction with respect to the centerline 291 and the disc 293 is fixed in the annular groove 289 of the shaft 263. Simultaneously, a pattern of grooves 295 corresponding to the die pattern 273 and a pattern of grooves 297 corresponding to the die pattern 287 are formed in a lower surface 299 and an upper surface 301 of the disc 293, respectively. The pressure force of the press tool is exerted until the pressure surface 283 of the second die 279 abuts against the upper surface 277 of the collar 275 of the first die 265. In this way, the lower and upper surfaces 299, 301 of the disc 293 extend perpendicular to the centerline 291 of the shaft 263 at a mutual distance which is equal to the height h of the disc 293.

Figure 8B:
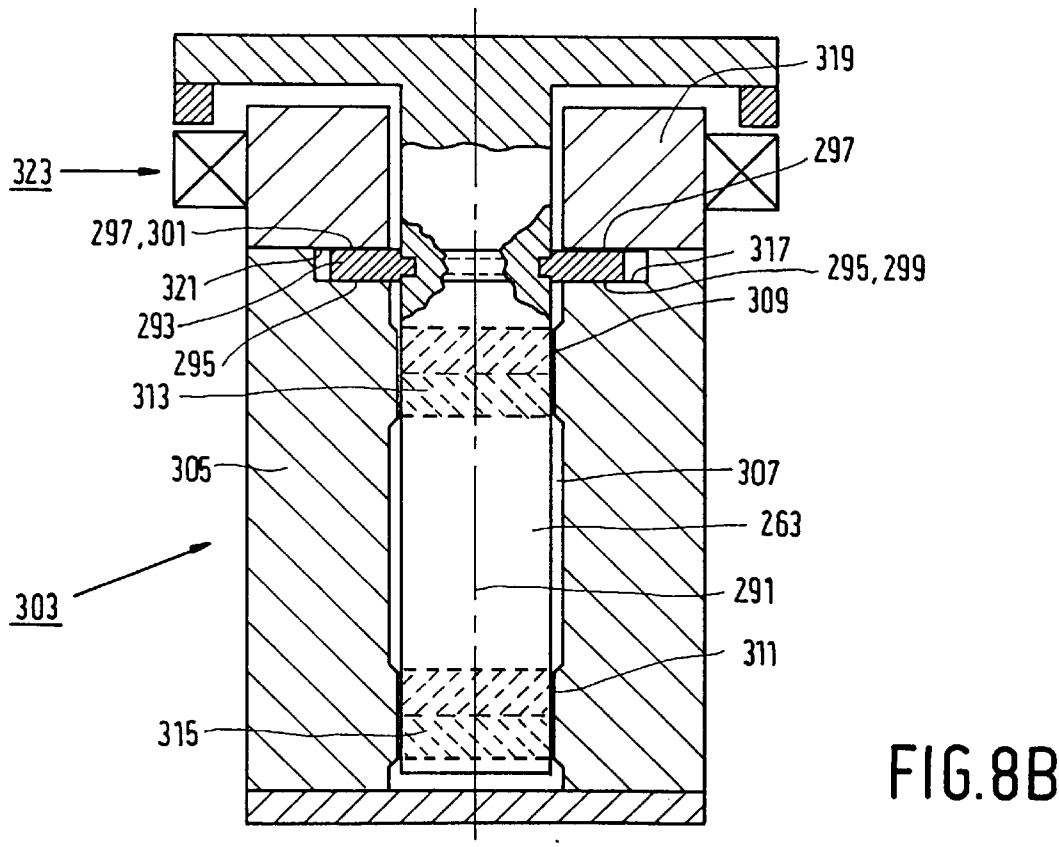

FIG. 8b shows a dynamic groove bearing 303 comprising the shaft 263 with the disc 293, manufactured by the method of FIG. 8a, as an internal bearing part. The dynamic groove bearing 303 comprises a housing 305 having a cavity 307 with first and second circular cylindrical walls 309 and 311. The walls 309 and 311 cooperate with first and second groove patterns 313 and 315, respectively, which are provided on the shaft 263, so as to form a radial dynamic groove bearing for supporting the shaft 263 in a radial direction with respect to the housing 305. Furthermore, the housing 305 comprises a surface 317 extending perpendicular to the centerline 291 for cooperation with the pattern of grooves 295 in the lower surface 299 of the disc 293. The housing 305 is closed by means of a closing member 319 comprising a surface 321 extending perpendicular to the centerline 291 for cooperation with the pattern of grooves 297 in the upper surface 301 of the disc 293. Said surfaces 317, 321 and the patterns of grooves 295, 297 constitute an axial dynamic groove bearing for supporting the shaft 263 in an axial direction with respect to the housing 305. The shaft 263 is rotatable in the housing 305 by means of a drive unit 323, which is indicated diagrammatically in FIG. 8b.

In the examples described above, furthermore, the ductile material is fixed relative to the relevant bearing part each time by plastic deformation. It is noted that the bearing surface formed from the ductile material may also be fixed in an alternative manner relative to the bearing part, for example, by means of a lockwasher which is provided around the bearing surface after pressing.

As was described above, the bearing surfaces with the patterns of grooves are formed, for example, from white metal or Babbitt's metal. It is noted that, instead of the said alloys, alternative ductile materials may be used such as, for example, alloys of copper with tin or alloys of copper with tin, zinc and lead.

The preceding text describes the manufacture of a dynamic groove bearing 45 with a bearing surface 39 in the form of a sphere segment with which an axial and a radial bearing force can be absorbed, a dynamic groove bearing 71 with a conical bearing surface 63 with which also an axial and a radial bearing force can be absorbed, and a dynamic groove bearing 111 with a plane bearing surface 103 with which exclusively an axial bearing force can be absorbed. It is noted that bearing surfaces of a different shape may also be manufactured by the method described above, the shape of the bearing surface being such in all cases that the die is clearing after the formation of the bearing surface. A desired ratio between the radial and axial bearing forces to be absorbed may be achieved in a simple manner through a suitable design of the bearing surface and the groove pattern, while the bearing surfaces to be formed according to the method must in any case be capable of absorbing an axial bearing force.

The above describes the use of the dynamic groove bearing manufactured by the method in a rotatable scanning unit for a magnetic tape device and in a data storage unit with a magnetic hard disk. It is noted that the dynamic groove bearing manufactured by the method may also be used in other devices such as, for example, in so-called polygon scanners which comprise a polygonal mirror supported with rotation possibility by a dynamic groove bearing, or in miniaturised electric motors with a rotor supported by a dynamic groove bearing. In all these applications, the use of the method according to the invention leads to a major simplification and time saving in the production of large numbers of such devices or motors.

What is claimed is:

1. A method of manufacturing a bearing which comprises a bearing surface having a pattern of grooves upon said bearing surface, said method comprising the steps of:

providing a bearing surface part of ductile material, said bearing surface part being of a first shape and having such ductile properties so as to allow it to be deformed into a substantially different second shape, and having such ductile properties so as to allow for the accurate formation of substantially smaller deformations within said second shape, providing a bearing member which is shaped to receive said bearing surface part having said first shape, and further shaped to retain said bearing surface part having said second shape, positioning said bearing surface part of said first shape in said bearing member, providing a press tool and a die, said die having a die surface which is shaped as the inverse of said second shape of said bearing surface part, said die surface also having protrusions of substantially smaller dimension than the deformation between said first and second shapes of said bearing surface part, said protrusions being shaped as the inverse of the said pattern of grooves to be produced on the bearing surface, and, pressing said die against said bearing surface part within said bearing member to simultaneously:

deform said bearing surface part into said second shape, form said grooves in said deformed bearing surface part, and affix said bearing surface part within said bearing member, thereby providing a grooved bearing by a single manufacturing operation.

2. A method as claimed in claim 1, characterized in that the ductile material is at least one of: an alloy of tin with lead, an alloy of tin with antimony, and an alloy of tin with lead and antimony.

3. A method as claimed in claim 1, characterized in that the bearing surface with the pattern of grooves is integrated into a housing by the plastic deformation of the ductile material, the housing being fastened on a workbench of a press device which comprises a positioning device by means of which the die is positioned relative to the workbench and the housing during the formation of the bearing surface.

4. A method as claimed in claim 1, characterized in that the bearing surface with the pattern of grooves is formed in the bearing part, while the die comprises a mandrel which fits in the bearing part and by means of which the die is positioned relative to the bearing part during the formation of the bearing surface.

5. A method as claimed in claim 4, characterized in that the die pattern is present at an end of the mandrel, the end of the mandrel being applied in a compression chamber of the bearing part which tapers and merges into an opening for the press tool, while subsequently the ductile material is pressed around the end of the mandrel in the compression chamber by means of the press tool.

6. A method as claimed in claim 5, characterized in that a mandrel with a clearing end is used.

7. A method as claimed in claim 4, characterized in that the ductile material is provided between an upper surface of the bearing part, which upper surface extends perpendicular to a centerline of the bearing part, and a pressure surface of the die, on which pressure surface the die pattern is present and which extends perpendicular to a centerline of the mandrel, and is subsequently pressed onto the upper surface by the press tool and the die, whereby the plastic deformation of the ductile material takes place in radial direction and the ductile material is fixed in an annular groove of a collar provided on the upper surface.

8. A method as claimed in claim 1, characterized in that the bearing surface with the pattern of grooves is formed in a ring-shaped disc, which is made of the ductile material, the ring-shaped disc being provided first around the bearing part between a pressure surface of a first die, on which pressure surface a first die pattern is present and which extends perpendicular to a centerline of the bearing part, and a pressure surface of a second die, on which pressure surface a second die pattern is present and which extends perpendicular to the centerline of the bearing part, while the ring-shaped disc is subsequently pressed by the press tool between the pressure surfaces of the first die and the second die, whereby the plastic deformation of the ductile material takes place in radial direction with respect to the centerline and the ring-shaped disc is fixed in an annular groove provided in the internal bearing part.

9. A method as claimed in claim 1, characterized in that the die is positioned in an axial direction relative to the bearing part with the aid of a sensor during the formation of the bearing surface, which sensor measures an axial position of the die relative to the said bearing part.

10. A method of forming a bearing part with a bearing surface having a shape and a pattern of grooves, comprising the steps of:
  a) providing a mass of ductile material for a bearing surface, said mass having a first shape which is substantially different than the bearing surface shape,
  b) providing a bearing part with a receptacle for holding the ductile material,
  c) providing a die having a die surface with (i) a shape, and (ii) a pattern, said die surface shape being complementary to the bearing surface shape, and said die surface pattern being complementary of said bearing surface pattern of grooves,
  d) placing the mass of ductile material in the receptacle of said bearing part,
  e) plastically deforming the mass of ductile material by only one pressing of the die against the mass of ductile material to simultaneously:
    obtain the finished shape of the bearing surface containing the pattern of grooves,
    position the bearing surface relative to the bearing part, and
    secure the mass of ductile material in the bearing part.

11. A method according to claim 10, wherein said ductile material is selected from the group consisting of: an alloy of tin with lead, an alloy of tin with antimony, and an alloy of tin with lead and antimony.

12. A method according to claim 10, wherein the receptacle in the bearing part is a compression chamber having walls which taper and merge into a first opening for receiving the die.

13. A method according to claim 12, wherein the compression chamber has a second opening, the die is fixed in position relative to the first opening, and the mass of ductile material is plastically deformed against said die by a press tool introduced through said second opening.

14. A method according to claim 10, wherein no further finishing steps are performed on said bearing surface.

* * * * *